US012743934B2

(12) United States Patent
Merling et al.

(10) Patent No.: US 12,743,934 B2
(45) Date of Patent: Sep. 22, 2026

(54) SYSTEMS AND METHODS FOR DYNAMICALLY DETECTING DISABILITIES

(71) Applicant: Capital One Services, LLC, McLean, VA (US)

(72) Inventors: Mark Merling, Arlington, VA (US); Tyler Maiman, Melville, NY (US); Helen Temesghen-Blount, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 408 days.

(21) Appl. No.: 18/469,631

(22) Filed: Sep. 19, 2023

(65) Prior Publication Data

US 2025/0095455 A1 Mar. 20, 2025

(51) Int. Cl.

| | |
|---|---|
| ***G07F 19/00*** | (2006.01) |
| ***G06V 10/70*** | (2022.01) |
| ***G06V 20/52*** | (2022.01) |
| ***G06V 40/10*** | (2022.01) |
| ***H04M 3/38*** | (2006.01) |
| ***H04M 3/42*** | (2006.01) |

(52) U.S. Cl.

CPC ............ *G07F 19/207* (2013.01); *G06V 10/70* (2022.01); *G06V 20/52* (2022.01); *G06V 40/10* (2022.01); *H04M 3/385* (2013.01); *H04M 3/42391* (2013.01)

(58) Field of Classification Search

CPC ...... G07F 19/207; G06V 20/52; G06V 10/70; G06V 40/10; H04M 3/385; H04M 3/42391

See application file for complete search history.

(56) References Cited

U.S. PATENT DOCUMENTS

| | | | | |
|---|---|---|---|---|
| 7,864,991 | B2 * | 1/2011 | Espenlaub | G09B 21/006 382/248 |
| 2007/0238074 | A1 * | 10/2007 | Espenlaub | G09B 21/006 434/112 |
| 2008/0043934 | A1 * | 2/2008 | Gallick | H04M 1/2474 379/52 |
| 2008/0198222 | A1 * | 8/2008 | Gowda | A61H 3/061 348/E7.088 |
| 2019/0318331 | A1 * | 10/2019 | Wurmfeld | G06Q 20/1085 |
| 2022/0270512 | A1 * | 8/2022 | Dialameh | G06V 10/17 |

* cited by examiner

*Primary Examiner* — Pinalben Patel

(74) *Attorney, Agent, or Firm* — TROUTMAN PEPPER LOCKE LLP; Christopher J. Forstner; John A. Morrissett

(57) ABSTRACT

Disclosed embodiments may include a method for dynamically detecting disabilities. The method may include receiving image data and sensory data from an imaging device and one or more sensors of a user interacting with a machine, determining, using a machine learning model, whether the user interacting with the machine is impaired based on the image data or the sensory data, or combinations thereof, and in response to determining that the user is impaired: causing the machine to output a sound or one or more vibration sequences within a predetermined distance from a reader of the machine, initiating a phone call to a user device associated with the user using a phone number associated with the data, initiate a machine process, receiving, from the user device, a command to terminate the machine process, and transmitting a termination instruction to the machine.

20 Claims, 6 Drawing Sheets

SYSTEMS AND METHODS FOR DYNAMICALLY DETECTING DISABILITIES

FIELD

The disclosed technology relates to systems and methods for dynamically detecting disabilities. Specifically, this disclosed technology relates to dynamically detecting disability from an imaging device based on a user's interaction with a machine and in response to detecting a disability of the user, proceeding with a predetermined action to assist the user.

BACKGROUND

Some automated teller machines ("ATMs") may include a physical audio jack to assist disabled users during an interaction with the machine. Traditional systems and methods for dynamically detecting disabilities typically are limited and the resulting assistance methods after the detection of a disability is typically limited to the user contacting customer service or utilizing the physical audio jack on the machine.

Accordingly, there is a need for improved systems and methods for dynamically detecting disabilities. Embodiments of the present disclosure are directed to this and other considerations.

SUMMARY

Disclosed embodiments may include a system for dynamically detecting disabilities. The system may include one or more processors, and memory in communication with the one or more processors and storing instructions that, when executed by the one or more processors, are configured to cause the system to dynamically detect disabilities. The system may receive image data and sensory data from an imaging device and one or more sensors of a user interacting with a machine, determine, using a machine learning model, whether the user interacting with the machine is impaired based on the image data or the sensory data, or combinations thereof, and in response to determining that the user is impaired: cause the machine to output a sound or one or more vibration sequences within a predetermined distance from a reader of the machine, initiate a phone call to a user device associated with the user using a phone number associated with the data, initiate a machine process, receive, from the user device, a command to terminate the machine process, and transmit a termination instruction to the machine.

Disclosed embodiments may include a system for dynamically detecting disabilities. The system may include one or more processors, and memory in communication with the one or more processors and storing instructions that, when executed by the one or more processors, are configured to cause the system to dynamically detect disabilities. The system may receive from a reader of a machine, data associated with a user of the machine, determine whether the data associated with the user of the machine comprises a flag indicating the user is impaired, and in response to determining that the user is impaired: initiate a phone call to a user device of the user using a phone number associated with the data, initiate a machine process, receive, from the user device, a command to terminate the machine process, and transmit a termination instruction to the machine.

Disclosed embodiments may include a method for dynamically detecting disabilities. The method may include receiving data associated with a user of a machine, determining whether the data associated with the user of the machine comprises a flag indicating the user is impaired, responsive to determining that the data comprises a flag, initiating a phone call to a user device of the user using a phone number associated with the data, initiating a machine process, and transmitting a termination instruction to the machine.

Further implementations, features, and aspects of the disclosed technology, and the advantages offered thereby, are described in greater detail hereinafter, and may be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
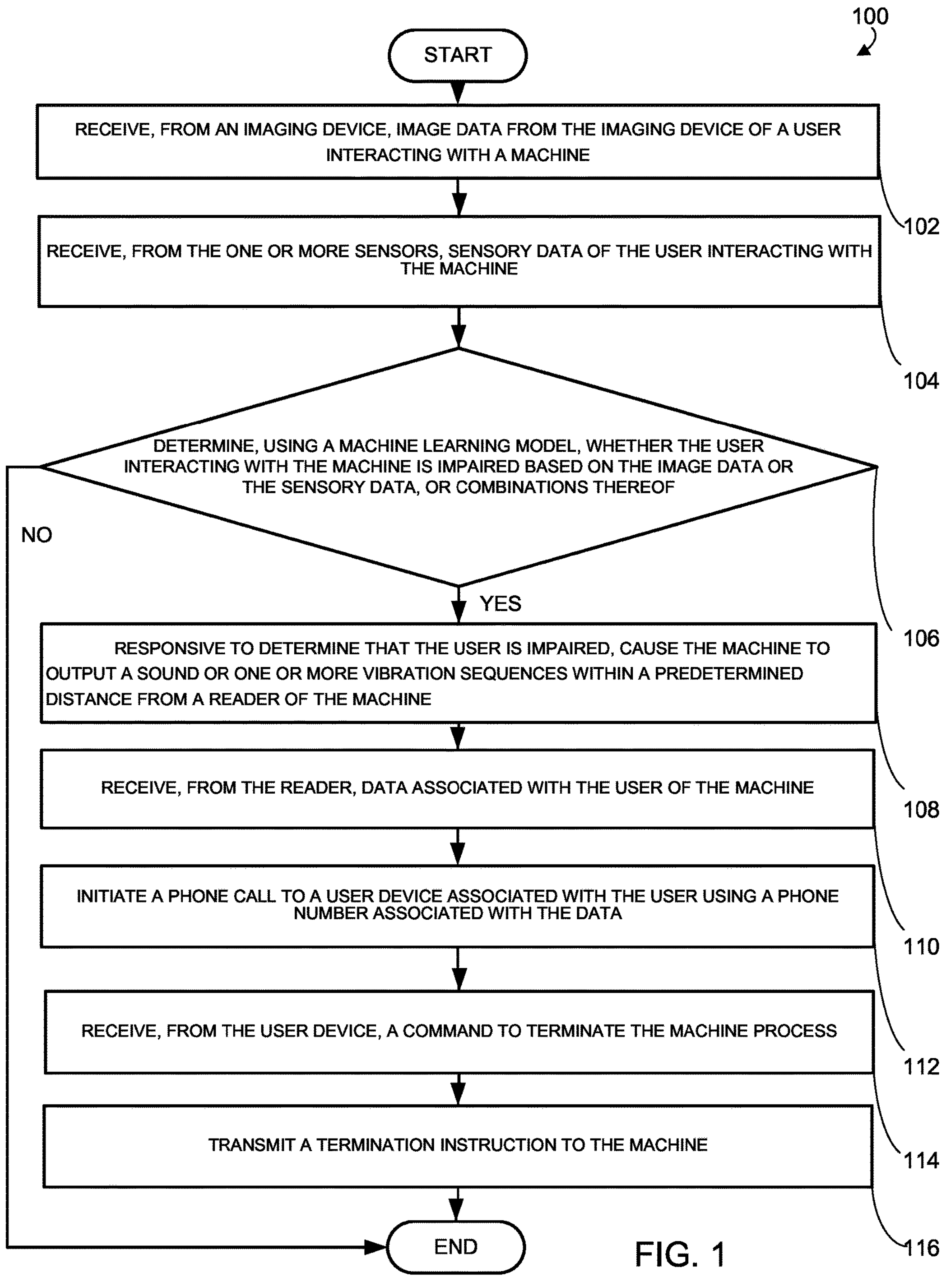
FIG. 1 is a flow diagram illustrating an exemplary method for dynamically detecting disabilities in accordance with certain embodiments of the disclosed technology.

Examples of the present disclosure related to systems and methods for dynamically detecting disabilities. More particularly, the disclosed technology relates to dynamically detecting disability from an imaging device based on a user's interaction with a machine 480 and in response to detecting a disability of the user, proceeding with a predetermined action to assist the user. The systems and methods described herein utilize, in some instances, machine learning models, which are necessarily rooted in computers and technology. Machine learning models are a unique computer technology that involves training models to complete tasks and make decisions. The present disclosure details using a machine learning model to determine whether a user interacting with a machine 480 is impaired. This, in some examples, may involve using image data or sensory data as input data and a machine learning model, applied and trained to analyze a user interacting with a machine 480, and outputs a result of a determination of whether the user of the machine 480 is impaired. Using a machine learning model in this way may allow the system to dynamically detect disabilities in users of the machine 480 which may require additional forms of assistance.

This is a clear advantage and improvement over prior technologies that usually only provide a customer service number for the user to call or a button on a keypad 484 on the machine 480 to contact support because a user may want to be able to have the ability to complete a transaction independently without having to reach out to a customer support number. The present disclosure solves this problem by using various methods to detect a disability of the user and then present the user with alternative methods of assistance. Furthermore, examples of the present disclosure may also improve experiences for customers by allowing the customers with disabilities to complete transactions without having to rely on assistance from customer service support. This in turn may improve the speed of transactions for customers with disabilities. Overall, the systems and methods disclosed have significant practical applications in the disability detection field because of the noteworthy improvements of the machine learning model which analyzes the image data and sensory data in real time to determine if a user is impaired, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for dynamically detecting disabilities, in accordance with certain embodiments of the disclosed technology. The steps of method 100 may be performed by one or more components of the system 500 (e.g., dynamic detection system 420 or web server 510 of detection system 508), as described in more detail with respect to FIGS. 4 and 5. In this example, a web server 510 may implement the below blocks. In other embodiments, a cloud service or cloud servers may implement the below blocks. A plurality of web servers 510 or cloud servers may implement the below blocks as well.

In block 102, the dynamic detection system 420 may receive from an imaging device 487, image data from the imaging device 487 of a user interacting with a machine 480. The machine 480 may be an automated teller machine or any kind of machine that permits a user to interact with the machine 480 for a service to be completed. The machine 480 may have an imaging device 487. A structure close to the machine 480 may have the imaging device 487. The imaging device 487 may be a camera or any device known in the art that may capture an image or a plurality of images (e.g., imaging device 487 and/or others). The machine 480 may have a plurality of imaging devices 487 to capture multiple images from a variety of angles. The plurality of imaging devices 487 may capture different types of images or data known in the art. The plurality of imaging devices 487 do not have to capture the same type of data. Each of the plurality of imaging devices 487 may capture an image or a plurality of images. Each of the plurality of imaging devices 487 may also capture video footage. In some embodiments, the plurality of imaging devices 487 may also capture audio data.

In block 104, the dynamic detection system 420 may receive from the one or more sensors 488 (e.g., sensor 488 and/or others), sensory data of the user interacting with the machine 480. The one or more sensors 488 may be located on the machine 480 or on a different structure than the machine 480. The one or more sensors 488 may detect or measure objects within range of the sensor. In some examples, the one or more sensors 488 may detect if someone has touched the machine 480. The one or more sensors 488 may also detect if a button on the machine 480 has been pressed. The one or more sensors 488 may detect if a machine 480 has been touched in a plurality of locations on the machine 480. The one or more sensors 488 may include different type of sensors such as a position, pressure, temperature, force, humidity, or motion sensors. The one or more sensors 488 may include an environmental sensor for obtaining audio or visual data, such as a microphone and/or digital camera, and a geographic location sensor for determining the location of the device. The one or more sensors 488 may all be of the same type of sensor as well. The one or more sensor 488 may capture different kinds of sensory data known in the art, and the sensory sensor may later be used by the dynamic detection system 420.

In block 106, the dynamic detection system 420 may determine, using a machine learning model, whether the user interacting with the machine 480 is impaired based on the image data or the sensory data, or combinations thereof. The dynamic detection system 420 may utilize a machine learning model, such as one described below, to determine whether the user interacting with the machine 480 is impaired based on the image data or the sensory data. The dynamic detection system 420 may use the machine learning model to determine whether the data of the user interacting with the machine 480 includes a flag indicating the user is impaired. The dynamic detection system 420 may determine using the machine learning model that the user is impaired by identifying a disability aid in a portion of the image data. A disability aid may include a cane, glasses, a wheelchair, or combinations thereof. The dynamic detection system 420 using the machine learning model may be trained to analyze the image data to identify the disability aid or a plurality of disability aids in the image data. In some embodiments, the dynamic detection system 420 may determine using the machine learning model that from the image data that a user is impaired if the user is located within a portion of the image data, but is not approaching the machine 480 in a straight path. For example, if a user is having difficulty finding the machine 480 and is walking towards the machine 480 at different angles, the dynamic detection system 420 may determine using the machine learning model that the user is impaired. In other embodiments, the dynamic detection system 420, using the machine learning model, may be able to detect facial structures of the user and compare the facial structures to saved facial image data associated with an account of the user.

The dynamic detection system 420 may determine using the machine learning model that the user is impaired by identifying whether the user interacted with a predetermined number of sensors of the one or more sensors. For example, if an impaired user is feeling around the machine 480 looking for an audio jack 485 or keypad 484 with buttons, the user who is impaired may interact with multiple number of sensors of the one or more sensors 488. The user may touch the machine 480 in multiple locations in order to find interactive components of the machine 480 (e.g., reader 482, display 483, keypad 484, audio jack 485, dispenser 486, and other interactive components). The dynamic detection system 420 may analyze using the machine learning model that the number of touches of the user with the machine 480 and combine any data of disability aids to determine if the user is disabled and in need of accessibility services. Additionally, in some embodiments, the dynamic detection system 420 may determine using the machine learning model whether there is a threat to the user in a portion of the image data. The dynamic detection system 420 using the machine learning model may detect another person in the portion of the image data. The dynamic detection system 420 using the machine learning model may detect a car approaching the user in the portion of the image data. The dynamic detection system 420 using the machine learning model may detect other types of threats known in the art. In response to determining that the user is threatened, the dynamic detection system 420 may send a signal to the machine 480 to lock any inserted cards in the reader 484 of the machine 480. Alternatively, the dynamic detection system 420 may initiate a phone call to contact the police. The dynamic detection system 420 may send a sound to speakers 481 on or close to the machine 480 as an alarm to deter the threat. If the dynamic detection system 420 determines that the user is impaired, the dynamic detection system 420 may proceed to block 108 below. If the dynamic detection system 420 determines that the user is not impaired, the dynamic detection system 420 may terminate and not proceed to block 108, and allow the user to complete any machine processes by directly interacting with the machine 480.

In block 108, the dynamic detection system 420 may in response to determining that the user is impaired, cause the machine 480 to output a sound or one or more vibration sequences within a predetermined distance from the reader 482 of the machine 480. If a user is impaired, the machine's 480 sound or one or more vibration sequences may assist the user in locating the reader 482 of the machine 480 to insert a card associated with an account of the user. The sound may be a series of beeps, a single tone, or other sounds. The dynamic detection system 420 may send the sound to remote speakers within a predetermined distance from the reader 482 of the machine 480. At the direction of the dynamic detection system 420, the remote speakers may play the sound so that the user may locate the reader of the machine 480. The dynamic detection system 420 may send one or more vibration sequences to a device or unit capable of creating the one or more vibration sequences. The device or unit may be within the predetermined distance from the reader 482 of the machine 480. The dynamic detection system 420 may select the predetermined distance by determining a required distance an impaired user would need the sound or one or more vibrations from the reader 482 of the machine 480 to locate the reader 482 of the machine 480.

In block 110, the dynamic detection system 420 may receive, from the reader, data associated with the user of the machine 480. In some examples, the reader 482 on the machine 480 may be a card reader. The user may insert a card associated with an account of the user into the reader 482 of the machine 480. The dynamic detection system 420 may then retrieve account information which may indicate that the user is impaired and may require accessibility services. The dynamic detection system 420 may use the account information in conjunction with the machine learning model to determine if the user is in need of accessibility services. The dynamic detection system 420 may also use the account information to confirm the determination of the dynamic detection system 420 using the machine learning model. In some examples, the dynamic detection system 420 may also use the account information to train the machine learning model. For example, if the dynamic detection system 420 determines using the machine learning model that a user is not impaired, but the account information indicates the user is impaired and in need of accessibility services. The dynamic detection system 420 may reanalyze, using the machine learning model, the image data and sensory data to determine why the dynamic detection system 420 did not determine that the user is impaired. The dynamic detection system 420 may then take the reanalyzed data to retrain the machine learning model so that in the future, the dynamic detection system 420 using the machine learning model is able to better detect users that are impaired.

In block 112, the dynamic detection system 420 may initiate a phone call to a user device associated with the user using a phone number associated with the data. In some examples, instead of initiating a phone call to the user device associated with the user using the phone number associated with the data, the dynamic detection system 420 may provide the below options and commands through a speaker 481 on the machine 480. The phone call may offer a plurality of options to the user to assist in completing a transaction with the machine 480. The plurality of options may include allowing the dynamic detection system 420 to authenticate the user or offering to call the user through the user device to speak with customer support. If the dynamic detection system 420 authenticates the user through the phone call, once the user is authenticated, the phone call may include options to allow the user to initiate a machine process. The dynamic detection system 420 may receive from the user device during the phone call, audio data associated with the user. The dynamic detection system 420 may also authenticate the user by comparing authentication data extracted from the audio data to data associated with the account from the user. The dynamic detection system 420, or an associated system, may authenticate the user by comparing patterns in audio data from the user device to patterns in prerecorded voice data in the data associated with the account from the user. In some examples, the dynamic detection system 420, or an associated system, may authenticate the user by comparing authentication responses in the audio data received from the user device to prerecorded authentication responses in the data associated with the account from the user. Once the dynamic detection system 420, or an associated system, authenticates the user, the dynamic detection system 420, or an associated system, may initiate a phone call that includes options to allow the user to initiate a machine process. The machine process may include depositing funds, extracting funds, looking up account balances, or any other kind of machine processes that are known in the art. As an alternative to the dynamic detection system 420, or an associated system, initiating a phone call to the user device, the dynamic detection system 420 may alert a representative at a branch close to the machine 480 to help the user. If the user does not prefer to be assisted by the representative at the branch, and would rather connect to the machine 480 to hear instructions to follow during the transaction, alternatively, the dynamic detection system 420 may send sounds to the machine 480 to emit through speakers 481 to instruct the user on how to use Bluetooth headphone pairing. Once Bluetooth headphone pairing is complete, the dynamic detection system 420, or an associated system, may prompt the user to initiate a different machine process.

In block 114, the dynamic detection system 420 may receive, from the user device, a command to terminate the machine process. In some examples, dynamic detection system 420 may receive from the user device during the phone call, audio data associated with the user. The dynamic detection system 420 may compare termination commands in the audio data received from the user device to prerecorded termination commands. In some embodiments, a dynamic detection system 420 sends a prompt to the user device asking for confirmation that the user would like to terminate the machine process or if the user would like to initiate a new machine process related to the account of the user.

In block 116, the dynamic detection system 420 may transmit a termination instruction to the machine 480. In some examples, once the dynamic detection system 420 confirms in block 114 that the user has sent a command to terminate the machine process, the dynamic detection system 420 may terminate the machine process and the phone call. If the user was depositing funds, extracting funds, or looking up account balances, the dynamic detection system 420 may terminate the processes by removing any account data from any screens on the machine 480, by ejecting any cards in the reader of the machine 480, or by terminating the phone call on the user device. Additionally, in some examples, the dynamic detection system 420 may require a new authentication process if a termination instruction is received by the machine 480.

Figure 2:
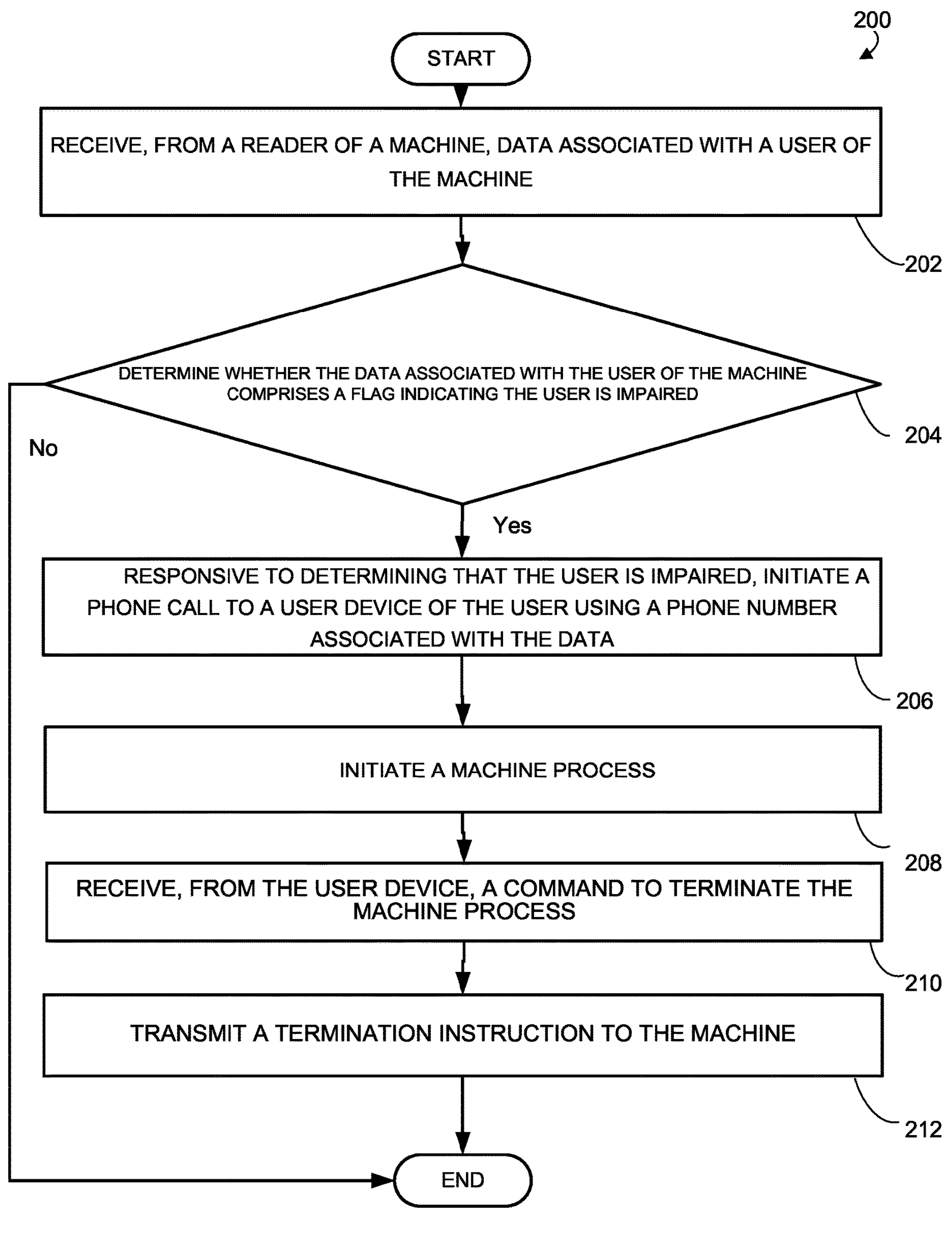
FIG. 2 is a flow diagram illustrating an exemplary method for dynamically detecting disabilities in accordance with certain embodiments of the disclosed technology.

FIG. 2 is a flow diagram illustrating an exemplary method 200 for dynamically detecting disabilities, in accordance with certain embodiments of the disclosed technology. The steps of method 200 may be performed by one or more components of the system 500 (e.g., dynamic detection system 420 or web server 510 of detection system 508), as described in more detail with respect to FIGS. 4 and 5.

Method 200 of FIG. 2 is similar to method 100 of FIG. 1, except that method 200 may not include blocks 102, 104, 106, or 108 of method 100. The descriptions of blocks 202, 206, 210, and 212 in method 200 are similar to the respective descriptions of blocks 110, 112, 114, and 116 of method 100 and are not repeated herein for brevity. However, additional blocks 204 and 208 are also described below.

In block 204, the dynamic detection system 420 may determine whether the data associated with the user of the machine 480 includes a flag indicating the user is impaired. In some examples, the reader 482 on the machine 480 may be a card reader. The user may insert a card associated with an account of the user into the reader 482 of the machine 480. The dynamic detection system 420 may then retrieve data associated with the user of the machine 480 which may indicate that the user is impaired and may require accessibility services. This may allow the dynamic detection system 420 to generate a flag indicating the user is impaired. In some embodiments, a flag is not generated, and instead the dynamic detection system 420 automatically proceeds to block 206 after determining that the user is impaired from the data associated with the account of the user.

In block 208, the dynamic detection system 420 may initiate a machine process. The machine process may include depositing funds, extracting funds, looking up account balances, or any other kind of machine processes that are known in the art. As an alternative to the dynamic detection system 420, or an associated system, initiating a phone call to the user device, the dynamic detection system 420 may alert a representative at a branch close to the machine 480 to help the user. If the user does not prefer to be assisted by the representative at the branch, and would rather connect to the machine 480 to hear instructions to follow during the transaction, alternatively, the dynamic detection system 420 may send sounds to the machine 480 to emit through speakers 481 to instruct the user on how to use Bluetooth headphone pairing. Once Bluetooth headphone pairing is complete, the dynamic detection system 420, or an associated system, may prompt the user to initiate a different machine process.

Figure 3:
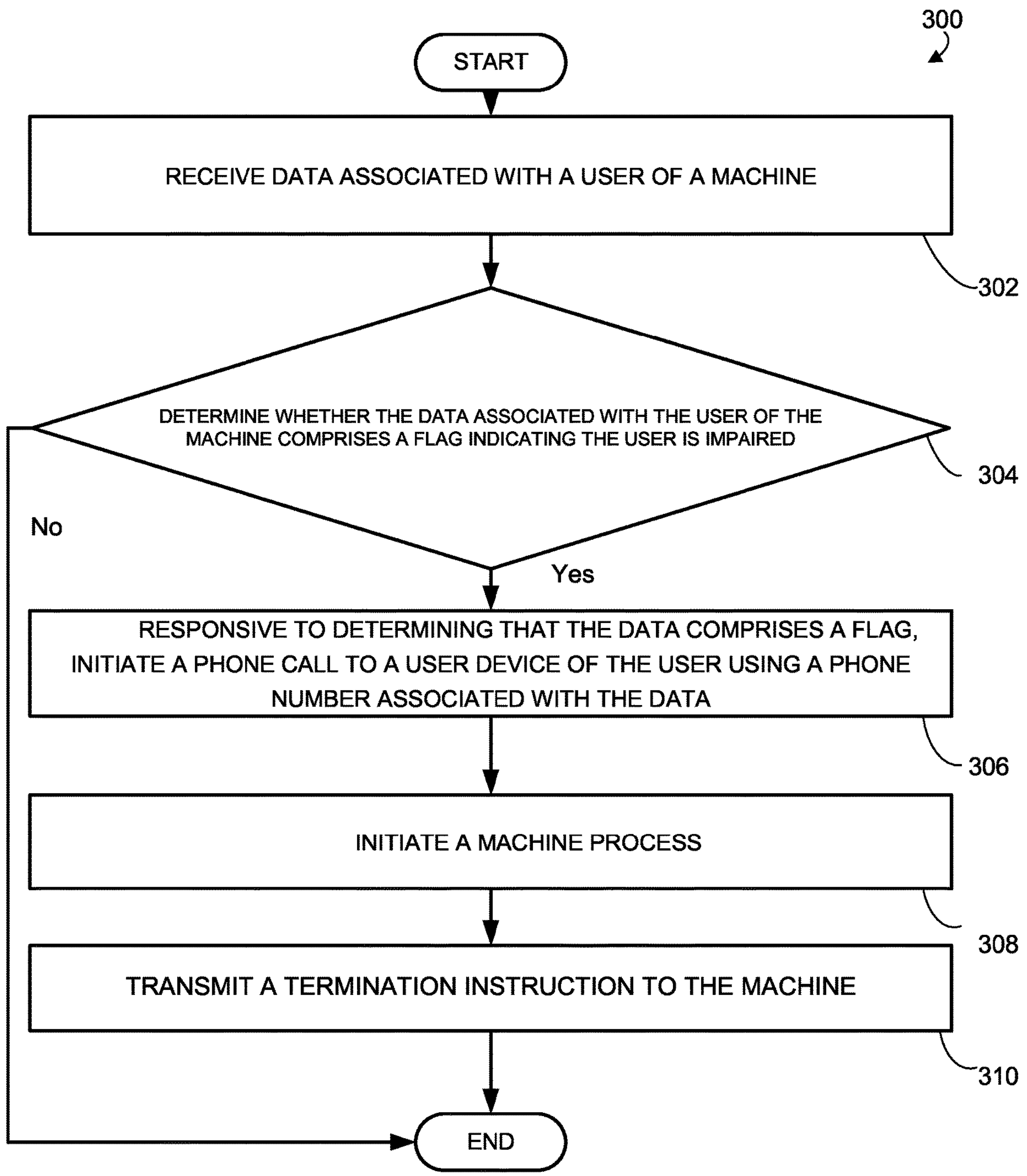
FIG. 3 is a flow diagram illustrating an exemplary method for dynamically detecting disabilities in accordance with certain embodiments of the disclosed technology.

Method 300 of FIG. 3 is similar to method 200 of FIG. 2, except that method 300 may not include block 210 of method 200. The descriptions of blocks 304, 306, 308, and 310 in method 200 are similar to the respective descriptions of blocks 204, 206, 208, and 212 in method 200 and are not repeated herein for brevity. Additionally, block 302 is similar to the description of blocks 102 and 104 in method 100 and block 202 in method 200 and are not repeated herein for brevity.

Figure 4A:
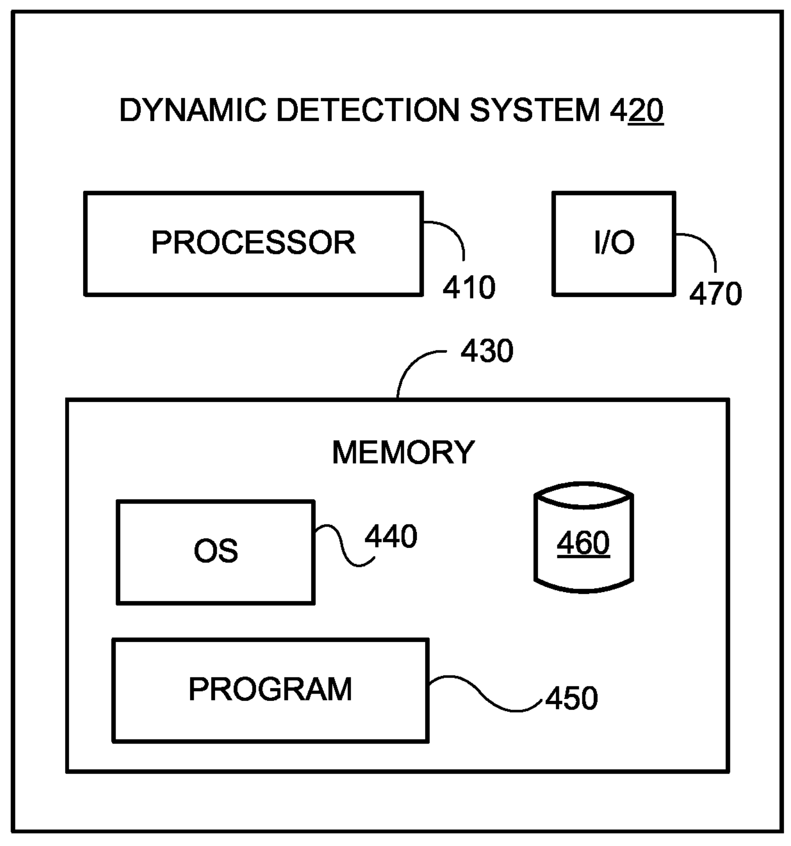
FIG. 4A is block diagram of an example dynamic detection system used to provide dynamically detecting disabilities, according to an example implementation of the disclosed technology.
Figure 5:
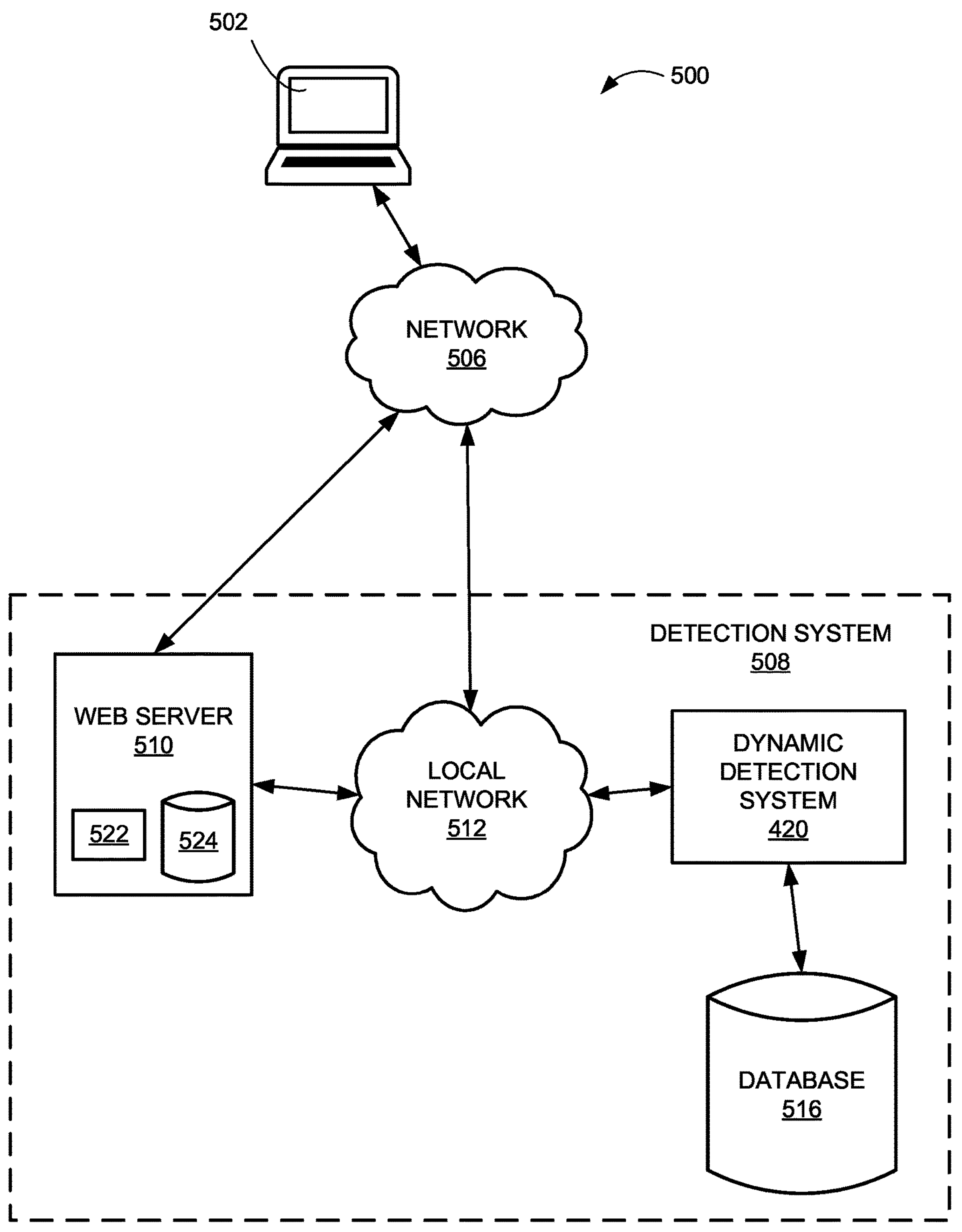
FIG. 5 is block diagram of an example system that may be used to provide dynamically detecting disabilities, according to an example implementation of the disclosed technology.

FIG. 4A is a block diagram of an example dynamic detection system 420 used to dynamically detect disabilities according to an example implementation of the disclosed technology. According to some embodiments, the user device 502 and web server 510, as depicted in FIG. 5 and described below, may have a similar structure and components that are similar to those described with respect to dynamic detection system 420 shown in FIG. 4A. As shown, the dynamic detection system 420 may include a processor 410, an input/output (I/O) device 470, a memory 430 containing an operating system (OS) 440 and a program 450. In certain example implementations, the dynamic detection system 420 may be a single server or may be configured as a distributed computer system including multiple servers or computers that interoperate to perform one or more of the processes and functionalities associated with the disclosed embodiments. In some embodiments dynamic detection system 420 may be one or more servers from a serverless or scaling server system. In some embodiments, the dynamic detection system 420 may further include a peripheral interface, a transceiver, a mobile network interface in communication with the processor 410, a bus configured to facilitate communication between the various components of the dynamic detection system 420, and a power source configured to power one or more components of the dynamic detection system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 410 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 410 may be a single core processor that is configured with virtual processing technologies. In certain embodiments, the processor 410 may use logical processors to simultaneously execute and control multiple processes. The processor 410 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the dynamic detection system 420 may include one or more storage devices configured to store information used by the processor 410 (or other components) to perform certain functions related to the disclosed embodiments. In one example, the dynamic detection system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The dynamic detection system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the dynamic detection system 420 may include the memory 430 that may include one or more programs 450 to perform one or more functions of the disclosed embodiments. For example, in some embodiments, the dynamic detection system 420 may additionally manage dialogue and/or other interactions with the customer via a program 450.

The processor 410 may execute one or more programs 450 located remotely from the dynamic detection system 420. For example, the dynamic detection system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a dynamic detection system database 460 for storing related data to enable the dynamic detection system 420 to perform one or more of the processes and functionalities associated with the disclosed embodiments.

The dynamic detection system database 460 may include stored data relating to status data (e.g., average session duration data, location data, idle time between sessions, and/or average idle time between sessions) and historical status data. According to some embodiments, the functions provided by the dynamic detection system database 460 may also be provided by a database that is external to the dynamic detection system 420, such as the database 516 as shown in FIG. 5.

The dynamic detection system 420 may also be communicatively connected to one or more memory devices (e.g., databases) locally or through a network. The remote memory devices may be configured to store information and may be accessed and/or managed by the dynamic detection system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dynamic detection system 420 may also include one or more I/O devices 470 that may include one or more interfaces for receiving signals or input from devices and providing signals or output to one or more devices that allow data to be received and/or transmitted by the dynamic detection system 420. For example, the dynamic detection system 420 may include interface components, which may provide interfaces to one or more input devices, such as one or more keyboards, mouse devices, touch screens, track pads, trackballs, scroll wheels, digital cameras, microphones, sensors, and the like, that enable the dynamic detection system 420 to receive data from a user (such as, for example, via the user device 502).

In examples of the disclosed technology, the dynamic detection system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The dynamic detection system 420 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, a transformer model, and/or another machine learning model. In some embodiments, the dynamic detection system 420 may use the transformer model to create embeddings of customer behavior on an ATM machine that would help identify whether a customer needs additional assistance. In some embodiments, similarity searches on the embeddings can be combined with cosine similarities to compare embeddings of customers with and without disabilities. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The dynamic detection system 420 may be configured to adjust model parameters during training. Model parameters may include weights, coefficients, offsets, or the like. Training may be supervised or unsupervised.

The dynamic detection system 420 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The dynamic detection system 420 may be configured to optimize statistical models using known optimization techniques.

The dynamic detection system 420 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may include combinations of decision tree predictors. (Decision trees may include a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the dynamic income verification system may analyze information applying machine-learning methods.

While the dynamic detection system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the dynamic detection system 420 may include a greater or lesser number of components than those illustrated.

Figure 4B:
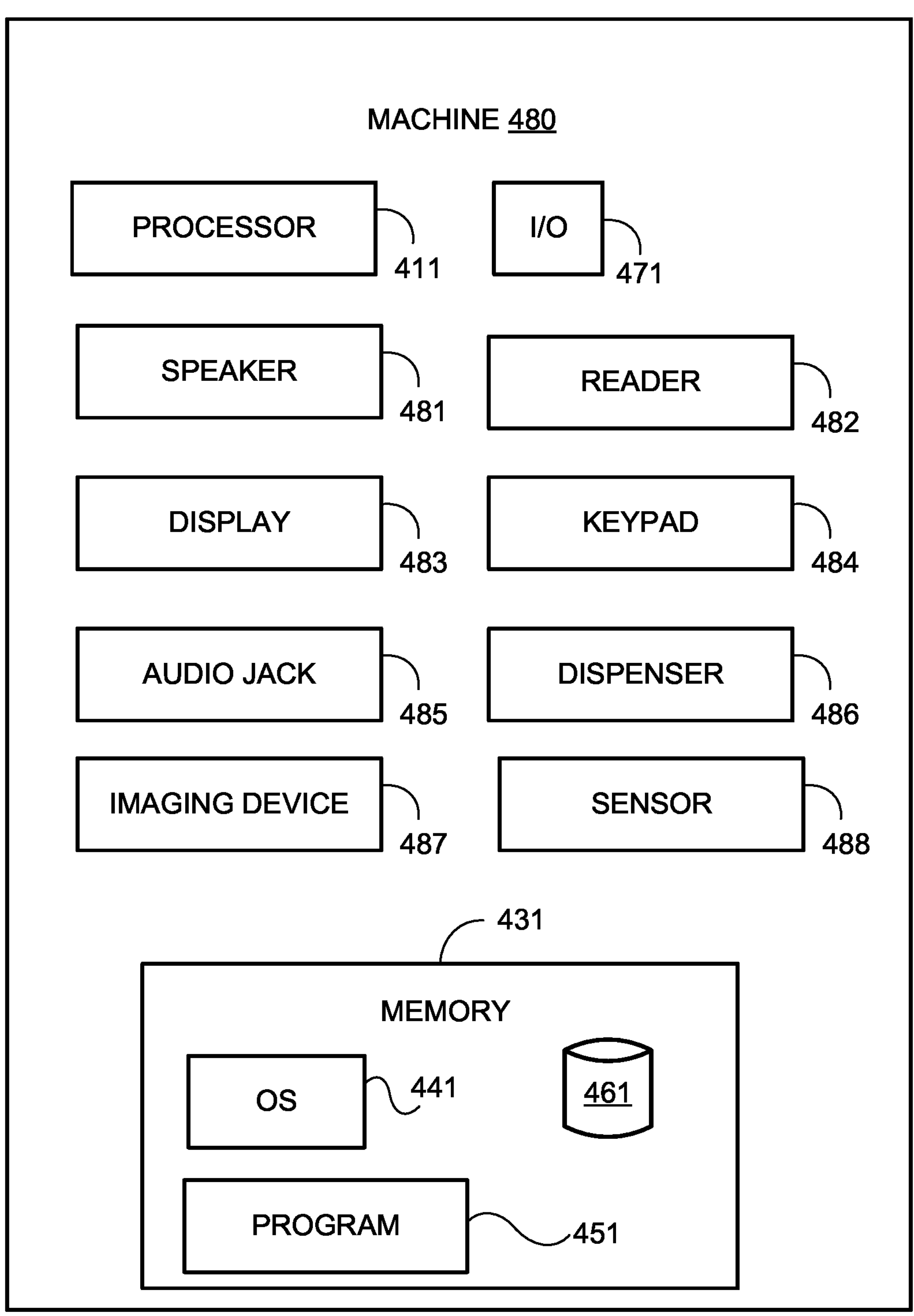
FIG. 4B is a block diagram of an example machine used in conjunction with the dynamic detection system, according to an example implementation of the disclosed technology.

FIG. 4B is a block diagram of an example machine 480 used in conjunction with the dynamic detection system, according to an example implementation of the disclosed technology. As shown, the machine 480 may include a processor 411, input/output (I/O) device 471, memory 431, operating system (OS) 441, program 451, and database 461. According to some embodiments, the components of machine 480 may have similar components to those described with respect to dynamic detection system 420 as shown FIG. 4A. For example, the descriptions of processor 411, input/output (I/O) device 471, memory 431, operating system (OS) 441, program 451, and database 461 are similar to the respective descriptions of components processor 410, input/output (I/O) device 470, memory 430, operating system (OS) 440, program 450, and database 460 of FIG. 4A and are not repeated herein for brevity. In some embodiments, the machine 480 may include a peripheral interface, a transceiver, a mobile network interface in communication with the processor 411, a bus configured to facilitate communication between the various components of the machine 480, and a power source configured to power one or more components of the machine 480. The peripheral interface, transceiver, and mobile network interface of machine 480 also have similar descriptions to the peripheral interface, transceiver, and mobile network interface of dynamic detection system 420 as described above.

The machine 480 illustrated in FIG. 4B may also include one or more speakers 481 that may include one or more interfaces for receiving signals or input from devices. The one or more speakers 481 may output signals. For example, the one or more speakers 481 may include interface components, which may provide interfaces to one or more input devices, such as one or more microphones, keyboards, and the like, that enable the speakers 481 to receive data to output.

The machine 480 illustrated in FIG. 4B may also include reader 482 that may include one or more interfaces for receiving input data. The reader 482 may be utilized to receive or collect data from a wide variety of cards. Received data may be processed by one or more computer processors as desired in various implementations of the disclosed technology and/or stored in one or more memory devices.

The machine 480 illustrated in FIG. 4B may also include display 483 that may display a user interface. The user interface may be displayed on any display capable of showing information, for example and not by way of limitation, a liquid crystal display, light emitting diode display, plasma display, organic light emitting diode display, light projection, laser, carbon nanotubes, holographic display, or other segment display, full-area two dimensional display, and/or three dimensional display. In some embodiments, display 483 may allow a user to interact with machine 480 through simple or multi-touch gestures by touching a screen or display (e.g., display 483). Display 483 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, display 483 may receive inputs from a touchscreen and process the received inputs.

The machine 480 illustrated in FIG. 4B may also include keypad 484 that may include a set of buttons arranged, for example, in a block or pad and may bear digits, symbols and/or alphabetical letters. Keypad 484 may be a hardware-based or mechanical-type keypad and/or implemented in software and displayed on, for example, a screen or touch screen to form a keypad. Keypad 484 may receive input from a user that pushed or otherwise activates one or more buttons on keypad 484 to provide input.

The machine 480 illustrated in FIG. 4B may also include audio jack 485 that may include any device capable of making an audio jack connection. The audio jack 485 may be capable of transmitting audio and/or data information, for instance, a 2.5 mm audio jack, a 3.5 mm or ⅛ inch audio jack, a multipronged audio jack, or other audio connection.

The machine 480 illustrated in FIG. 4B may also include dispenser 486 that may include a cash drawer for storing cash. The dispenser 486 may be capable of printing receipts. The dispenser 486 may include a slot to eject cash from the cash drawer or receipts.

FIG. 4A is a block diagram of an example system that may be used to view and interact with detection system 508, according to an example implementation of the disclosed technology. The components and arrangements shown in FIG. 4A are not intended to limit the disclosed embodiments as the components used to implement the disclosed processes and features may vary. As shown, detection system 508 may interact with a user device 502 via a network 506. In certain example implementations, the detection system 508 may include a local network 512, a dynamic detection system 420, a web server 510, and a database 516.

In some embodiments, a user may operate the user device 502. The user device 502 may include one or more of a mobile device, smart phone, general purpose computer, tablet computer, laptop computer, telephone, public switched telephone network (PSTN) landline, smart wearable device, voice command device, other mobile computing device, or any other device capable of communicating with the network 506 and ultimately communicating with one or more components of the detection system 508. In some embodiments, the user device 502 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the detection system 508. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network (VPN) using a public network, and/or other suitable connection(s) that enable(s) components in the system 500 environment to send and receive information between the components of the system 500. The network 506 may also include a PSTN and/or a wireless network.

The detection system 508 may be associated with and optionally controlled by one or more entities such as a business, corporation, individual, partnership, or any other entity that provides one or more of goods, services, and consultations to individuals such as customers. In some embodiments, the detection system 508 may be controlled by a third party on behalf of another business, corporation, individual, partnership. The detection system 508 may include one or more servers and computer systems for performing one or more functions associated with products and/or services that the organization provides.

Web server 510 may include a computer system configured to generate and provide one or more websites accessible to customers, as well as any other individuals involved in access system 408's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems of system 500. In some embodiments, web server 510 may host websites or applications that may be accessed by the user device 502. For example, web server 510 may host a financial service provider website that a user device may access by providing an attempted login that are authenticated by the dynamic detection system 420. According to some embodiments, web server 510 may include software tools, similar to those described with respect to user device 502 above, that may allow web server 510 to obtain network identification data from user device 502. The web server may also be hosted by an online provider of website hosting, networking, cloud, or backup services, such as Microsoft Azure™ or Amazon Web Services™.

The local network 512 may include any type of computer networking arrangement used to exchange data in a localized area, such as WiFi, Bluetooth™, Ethernet, and other suitable network connections that enable components of the detection system 508 to interact with one another and to connect to the network 506 for interacting with components in the system 500 environment. In some embodiments, the local network 512 may include an interface for communicating with or linking to the network 506. In other embodiments, certain components of the detection system 508 may communicate via the network 506, without a separate local network 506.

The detection system 508 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 502 may be able to access detection system 508 using the cloud computing environment. User device 502 may be able to access detection system 508 using specialized software. The cloud computing environment may eliminate the need to install specialized software on user device 502.

In accordance with certain example implementations of the disclosed technology, the detection system 508 may include one or more computer systems configured to compile data from a plurality of sources the dynamic detection system 420, web server 510, and/or the database 516. The dynamic detection system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, ATM, and business operations. The database 516 may also serve as a back-up storage device and may contain data and information that is also stored on, for example, database 460, as discussed with reference to FIG. 4A.

EXAMPLE USE CASE

The following example use case describes an example of a typical user flow pattern. This section is intended solely for explanatory purposes and not in limitation.

In one example, John, who has an impairment, decides to use an automated teller machine to complete a transaction with a banking company. The banking company offers services through the automated teller machine so that customers may deposit and withdraw funds or check their account balance through the automated teller machine. John approaches the ATM and has trouble locating the machine. John then touches multiple parts of the ATM to locate the keypad and the card reader of the ATM. John also has a walking cane. In some examples, John may have may not have trouble locating the machine but has a cane or vice versa. Thus, the dynamic detection system 420 receives image data and sensory data from an imaging device and one or more sensors (e.g., a camera) of John interacting with the ATM. The dynamic detection system 420 determines, using a machine learning model, whether John's interactions with the machine indicates John is impaired based on the image data or the sensory data, or combinations thereof. And in response to determining that John is impaired, the dynamic detection system 420 causes the machine to output a sound or one or more vibration sequences within a predetermined distance from a reader of the ATM so that John may locate the reader of the machine. The dynamic detection system 420 then initiates a phone call to John's cell phone using a phone number associated with the John's account information. The dynamic detection system 420 then initiates a machine process for John of either depositing or withdrawing funds from the ATM or informs John of his balance associated with his account. The dynamic detection system 420 receives, from John's cell phone, a command from John to terminate the machine process. Then, the dynamic detection system 420 transmits a termination instruction to the ATM to terminate all processes related to John's account because John has completed his transactions. In other examples, John may wish to dispense an amount of cash and speaks that command over the phone call to the dynamic detection system 420. Upon doing so, and after being authenticate previously or after speaking the command, the dynamic detection system 420 instruct the ATM to dispense cash the request amount of cash, which the ATM does so. John takes the dispensed cash and then walks away from the ATM.

In some examples, disclosed systems or methods may involve one or more of the following clauses:

Clause 1: A dynamic detection system comprising: an imaging device; one or more sensors; one or more processors; and memory in communication with the one or more processors and storing instructions that are configured to cause the dynamic detection system to: receive, from the imaging device, image data from the imaging device of a user interacting with a machine; receive, from the one or more sensors, sensory data of the user interacting with the machine; determine, using a machine learning model, whether the user interacting with the machine is impaired based on the image data or the sensory data, or combinations thereof; responsive to determining that the user is impaired, cause the machine to output a sound or one or more vibration sequences within a predetermined distance from a reader of the machine; receive, from the reader, data associated with the user of the machine; initiate a phone call to a user device associated with the user using a phone number associated with the data; initiate a machine process; receive, from the user device, a command to terminate the machine process; and transmit a termination instruction to the machine.

Clause 2: The dynamic detection system of clause 1, wherein the instructions, when executed by the one or more processors, are further configured to cause the dynamic detection system to: determine whether the data associated with the user of the machine includes a flag indicating the user is impaired, wherein the phone call is initiated in response to determining the user is impaired.

Clause 3: The dynamic detection system of clause 1, wherein the instructions, when executed by the one or more processors, are further configured to cause the dynamic detection system to: receive from the user device during the phone call, audio data associated with the user; and authenticate the user by comparing authentication data extracted from the audio data to the data.

Clause 4: The dynamic detection system of clause 1, wherein the machine learning model determines the user is impaired by identifying a disability aid in a portion of the image data.

Clause 5: The dynamic detection system of clause 1, wherein the machine learning model determines the user is impaired by identifying whether the user interacted with a predetermined number of sensors of the one or more sensors.

Clause 6: A dynamic detection system, comprising: one or more processors; and memory in communication with the one or more processors and storing instructions that are configured to cause the dynamic detection system to: receive, from a reader of a machine, data associated with a user of the machine; determine whether the data associated with the user of the machine includes a flag indicating the user is impaired; responsive to determining that the user is impaired, initiate a phone call to a user device of the user using a phone number associated with the data; initiate a machine process; receive, from the user device, a command to terminate the machine process; and transmit a termination instruction to the machine.

Clause 7: The dynamic detection system of clause 6, wherein the instructions, when executed by the one or more processors, are further configured to cause the dynamic detection system to: receive from the user device during the phone call, audio data associated with the user; and authenticate the user by comparing authentication data extracted from the audio data to the data.

Clause 8: The dynamic detection system of clause 7, wherein authenticating the user further includes comparing patterns in the audio data to patterns in prerecorded voice data in the data, or comparing authentication responses in the audio data to prerecorded authentication responses in the data.

Clause 9: The dynamic detection system of clause 6, wherein the dynamic detection system further includes an imaging device and wherein the instructions, when executed by the one or more processors, are further configured to cause the dynamic detection system to: receive, from the imaging device, image data of the user interacting with the machine; determine, using a machine learning model, whether the user interacting with the machine is impaired based on the image data; and responsive to determining that the user is impaired, cause the machine to output a sound or one or more vibration sequences within a predetermined distance from the reader of the machine.

Clause 10: The dynamic detection system of clause 9, wherein the machine learning model determines the user is impaired by identifying a disability aid in a portion of the image data.

Clause 11: The dynamic detection system of clause 10, the disability aid is a cane, glasses, a wheelchair, or a combination thereof.

Clause 12: The dynamic detection system of clause 6, wherein the dynamic detection system further includes one or more sensors and wherein the instructions, when executed by the one or more processors, are further configured to cause the dynamic detection system to: receive, from the one or more sensors, sensory data of the user interacting with the machine; determine, using a machine learning model, whether the user interacting with the machine is impaired based on the sensory data; and responsive to determining that the user is impaired, perform a sound or one or more vibration sequences within a predetermined distance from the reader of the machine.

Clause 13: A computer implemented method comprising: receiving data associated with a user of a machine; determining whether the data associated with the user of the machine includes a flag indicating the user is impaired; responsive to determining that the data includes a flag, initiating a phone call to a user device of the user using a phone number associated with the data; initiating a machine process; and transmitting a termination instruction to the machine.

Clause 14: The method of clause 13, further comprising: receiving from the user device during the phone call, audio data associated with the user; and authenticating the user by comparing authentication data extracted from the audio data to the data.

Clause 15: The method of clause 14, wherein authenticating the user further includes comparing patterns in the audio data to patterns in prerecorded voice data in the data, or comparing authentication responses in the audio data to prerecorded authentication responses in the data.

Clause 16: The method of clause 13, further comprising: receiving, from an imaging device, image data of the user interacting with the machine; determining, using a machine learning model, whether the user interacting with the machine is impaired based on the image data; and responsive to determining that the user is impaired, performing a sound or one or more vibration sequences within a predetermined distance from a reader of the machine.

Clause 17: The method of clause 16, further comprising: receiving, from one or more sensors, sensory data of the user interacting with the machine; determining, using the machine learning model, whether the user interacting with the machine is impaired based on the image data; and responsive to determining that the user is impaired, causing the machine to out a sound or one or more vibration sequences within a predetermined distance from the reader of the machine.

Clause 18: The method of clause 17, wherein the machine learning model determines the user is impaired i) by identifying a disability of the user in a portion of the image data, or ii) by determining whether the user interacted with a predetermined number of sensors of the one or more sensors.

Clause 19: The method of clause 18, the disability of the user is identified by detecting a cane, glasses, a wheelchair, a walking style, or a combination thereof in the portion of the image data.

Clause 20: The method of clause 13, further comprising: receiving, from an imaging device, image data of the user interacting with the machine; determining, using a machine learning model, whether there is a threat to the user in a portion of the image data; and responsive to determining that the user is threatened, sending a signal to the machine to lock an inserted card in a reader of the machine.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that may be executed by a processor using an interpreter.

The technology disclosed herein typically involves a high-level design effort to construct a computational system that may appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that may run on batteries but are not usually classified as laptops. For example, mobile devices may include, but are not limited to portable computers, tablet PCs, internet tablets, PDAs, ultra-mobile PCs (UMPCs), wearable devices, and smart phones. Additionally, implementations of the disclosed technology may be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamic detection system comprising:
an imaging device;
one or more sensors;
one or more processors; and
memory in communication with the one or more processors and storing instructions that are configured to cause the dynamic detection system to:
receive, from the imaging device, image data from the imaging device of a user interacting with a machine;
receive, from the one or more sensors, sensory data of the user interacting with the machine;
determine, using a machine learning model, whether the user interacting with the machine is impaired based on the image data or the sensory data, or combinations thereof, wherein the machine learning model determines the user is impaired by identifying a disability of the user in a portion of the image data;
responsive to determining that the user is impaired, cause the machine to output a sound or one or more vibration sequences within a predetermined distance from a reader of the machine;
receive, from the reader, data associated with the user of the machine;
initiate a phone call to a user device associated with the user using a phone number associated with the data;
initiate a process at the machine; and
transmit a termination instruction to the machine.

2. The dynamic detection system of claim 1, wherein the instructions, when executed by the one or more processors, are further configured to cause the dynamic detection system to:
determine whether the data associated with the user of the machine comprises a flag indicating the user is impaired, wherein the phone call is initiated in response to determining the user is impaired.

3. The dynamic detection system of claim 1, wherein the instructions, when executed by the one or more processors, are further configured to cause the dynamic detection system to:
receive, from the user device during the phone call, audio data associated with the user; and
authenticate the user by comparing authentication data extracted from the audio data to the data.

4. The dynamic detection system of claim 1, wherein the machine learning model determines the user is impaired by identifying a disability aid in a portion of the image data.

5. The dynamic detection system of claim 1, wherein the machine learning model determines the user is impaired by identifying whether the user interacted with a predetermined number of sensors of the one or more sensors.

6. A dynamic detection system, comprising:
one or more processors; and
memory in communication with the one or more processors and storing instructions that are configured to cause the dynamic detection system to:
receive, from a reader of a machine, data associated with a user of the machine;
determine whether the data associated with the user of the machine comprises a flag indicating the user is impaired;
receive, from one or more sensors, sensory data of the user interacting with the machine;
determine, using a machine learning model, whether the user interacting with the machine is impaired based on the sensory data, wherein the machine learning model determines the user is impaired by determining whether the user interacted with a predetermined number of sensors of the one or more sensors;

responsive to determining that the user is impaired, cause the machine to output a sound or one or more vibration sequences within a predetermined distance from a reader of the machine;

responsive to determining that the user is impaired, initiate a phone call to a user device of the user using a phone number associated with the data;

initiate a process at the machine; and transmit a termination instruction to the machine.

7. The dynamic detection system of claim 6, wherein the instructions, when executed by the one or more processors, are further configured to cause the dynamic detection system to:

receive, from the user device during the phone call, audio data associated with the user; and authenticate the user by comparing authentication data extracted from the audio data to the data.

8. The dynamic detection system of claim 7, wherein authenticating the user further comprises comparing patterns in the audio data to patterns in prerecorded voice data in the data, or comparing authentication responses in the audio data to prerecorded authentication responses in the data.

9. The dynamic detection system of claim 6, wherein the dynamic detection system further comprises an imaging device and wherein the instructions, when executed by the one or more processors, are further configured to cause the dynamic detection system to:

receive, from the imaging device, image data of the user interacting with the machine;

determine, using a machine learning model, whether the user interacting with the machine is impaired based on the image data; and responsive to determining that the user is impaired, cause the machine to output a sound or one or more vibration sequences within a predetermined distance from the reader of the machine.

10. The dynamic detection system of claim 9, wherein the machine learning model determines the user is impaired by identifying a disability aid in a portion of the image data.

11. The dynamic detection system of claim 10, the disability aid is a cane, glasses, a wheelchair, or a combination thereof.

12. The dynamic detection system of claim 6, wherein the dynamic detection system further comprises one or more sensors and wherein the instructions, when executed by the one or more processors, are further configured to cause the dynamic detection system to:

receive, from the one or more sensors, sensory data of the user interacting with the machine;

determine, using a machine learning model, whether the user interacting with the machine is impaired based on the sensory data; and responsive to determining that the user is impaired, perform a sound or one or more vibration sequences within a predetermined distance from the reader of the machine.

13. A computer implemented method comprising:

receiving data associated with a user of a machine;

determining whether the data associated with the user of the machine comprises a flag indicating the user is impaired;

receiving, from an imaging device, image data of the user interacting with the machine;

determining, using a machine learning model, whether the user interacting with the machine is impaired based on the image data, wherein the machine learning model determines the user is impaired by identifying a disability of the user in a portion of the image data;

responsive to determining that the data comprises a flag, initiating a phone call to a user device of the user using a phone number associated with the data;

initiating a process at the machine; and transmitting a termination instruction to the machine.

14. The method of claim 13, further comprising:

receiving, from the user device during the phone call, audio data associated with the user; and authenticating the user by comparing authentication data extracted from the audio data to the data.

15. The method of claim 14, wherein authenticating the user further comprises comparing patterns in the audio data to patterns in prerecorded voice data in the data, or comparing authentication responses in the audio data to prerecorded authentication responses in the data.

16. The method of claim 13, the disability of the user is identified by detecting a cane, glasses, a wheelchair, a walking style, or a combination thereof in the portion of the image data.

17. The method of claim 13, further comprising:

receiving, from an imaging device, image data of the user interacting with the machine;

determining, using a machine learning model, whether there is a threat to the user in a portion of the image data; and responsive to determining that the user is threatened, sending a signal to the machine to lock an inserted card in a reader of the machine.

18. The method of claim 13, wherein the machine learning model determines the user is impaired by determining that the user is not approaching the machine in a straight path based on the image data.

19. The method of claim 13, further comprising:

receiving, from one or more sensors, sensory data of the user interacting with the machine;

determining, using the machine learning model, whether the user interacting with the machine is impaired based on the image data; and responsive to determining that the user is impaired, causing the machine to out a sound or one or more vibration sequences within a predetermined distance from the reader of the machine.

20. The method of claim 19, wherein the machine learning model determines the user is impaired by determining whether the user interacted with a predetermined number of sensors of the one or more sensors.

* * * * *